(12) United States Patent
Asano

(10) Patent No.: US 10,528,659 B2
(45) Date of Patent: Jan. 7, 2020

(54) INFORMATION PROCESSING DEVICE AND INFORMATION PROCESSING METHOD

(71) Applicant: SONY CORPORATION, Tokyo (JP)

(72) Inventor: Yasuharu Asano, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/547,336

(22) PCT Filed: Nov. 26, 2015

(86) PCT No.: PCT/JP2015/083234
§ 371 (c)(1),
(2) Date: Jul. 28, 2017

(87) PCT Pub. No.: WO2016/132620
PCT Pub. Date: Aug. 25, 2016

(65) Prior Publication Data
US 2018/0024985 A1 Jan. 25, 2018

(30) Foreign Application Priority Data
Feb. 18, 2015 (JP) ................................. 2015-029551

(51) Int. Cl.
G06F 17/20 (2006.01)
G06F 17/27 (2006.01)
(Continued)

(52) U.S. Cl.
CPC ................ G06F 17/27 (2013.01); G06F 3/16 (2013.01); G06F 17/271 (2013.01);
(Continued)

(58) Field of Classification Search
CPC ........ G06F 17/20; G06F 17/21; G06F 17/212; G06F 17/27; G06F 17/2705;
(Continued)

(56) References Cited

U.S. PATENT DOCUMENTS 9,619,459 B2 * 4/2017 Hebert ................ G06F 17/2785
2014/0089314 A1 3/2014 Iizuka et al.
(Continued)

FOREIGN PATENT DOCUMENTS

| CN | 103562847 A | 2/2014 |
| CN | 104281259 A | 1/2015 |

(Continued)

OTHER PUBLICATIONS

International Search Report and Written Opinion of PCT Application No. PCT/JP2015/083234, dated Dec. 22, 2015, 01 pages of English Translation and 08 pages of ISRWO.

Primary Examiner — Qi Han
(74) Attorney, Agent, or Firm — Chip Law Group

(57) ABSTRACT

[Object] To present a response to a natural sentence in a more suitable aspect even in circumstances in which a natural sentence with ambiguity can be input. [Solution] An information processing device including: an acquisition unit configured to acquire an extraction result of candidates for a response to an input which is based on first information indicating a result of natural language analysis on a natural sentence acquired as the input and second information indicating a state or a situation involved in use of a predetermined device; and a control unit configured to cause a predetermined output unit to present information indicating the candidates for the response in an aspect corresponding to the extraction result of the candidates.

16 Claims, 7 Drawing Sheets

(51) Int. Cl.
  *G06F 3/16*   (2006.01)
  *G10L 15/18*  (2013.01)
  *G10L 15/22*  (2006.01)
  *G10L 15/26*  (2006.01)

(52) U.S. Cl.
  CPC ...... *G06F 17/2755* (2013.01); *G06F 17/2785* (2013.01); *G10L 15/1822* (2013.01); *G10L 15/22* (2013.01); *G10L 15/26* (2013.01)

(58) Field of Classification Search
  CPC .. G06F 17/2765; G06F 17/2775; G06F 17/28; G06F 17/2785
  USPC ................ 704/9, 1, 231, 257, 270, 275, 276
  See application file for complete search history.

(56) References Cited

U.S. PATENT DOCUMENTS

| | | | |
|---|---|---|---|
| 2015/0019974 A1 | 1/2015 | Doi et al. | |
| 2016/0098986 A1* | 4/2016 | Hofer | G10L 15/083 704/243 |
| 2016/0180438 A1* | 6/2016 | Boston | G06Q 30/0631 705/26.7 |

FOREIGN PATENT DOCUMENTS

| | | |
|---|---|---|
| EP | 2717144 A1 | 4/2014 |
| EP | 2824564 A1 | 1/2015 |
| JP | 2015-018365 A | 1/2015 |
| WO | 2012/165122 A1 | 12/2012 |

\* cited by examiner

FIG. 3

| | REMAINING BATTERY AMOUNT | COMMUNICATION ENVIRONMENT | INDOORS | INSIDE AUTOMOBILE | USER Uc | USER Ud |
|---|---|---|---|---|---|---|
| TELEPHONE | | -100.0 | | +10.0 | +10.0 | |
| ELECTRONIC MAIL | | | | -5.0 | | |
| MESSAGE FUNCTION | | | | -10.0 | +5.0 | +15.0 |
| MUSIC REPRODUCTION (LIBRARY) | -5.0 | | | | | |
| MUSIC REPRODUCTION (STREAMING) | -10.0 | -100.0 | | | | |
| MOVING IMAGE REPRODUCTION (LIBRARY) | -20.0 | | | | | |
| MOVING IMAGE REPRODUCTION (STREAMING) | -5.0 | -100.0 | | | | |
| MAP | | -100.0 | | +10.0 | | |
| TRANSFER GUIDE | | -100.0 | | -10.0 | | |

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2015/083234 filed on Nov. 26, 2015, which claims priority benefit of Japanese Patent Application No. JP 2015-029551 filed in the Japan Patent Office on Feb. 18, 2015. Each of the above-referenced applications is hereby incorporated herein by reference in its entirety.

TECHNICAL FIELD

The present disclosure relates to an information processing device, an information processing method, and a program.

BACKGROUND ART

In recent years, sound combination technologies of converting text information into sounds, sound recognition technologies of recognizing content uttered by users as text information, and natural language processing technologies of recognizing content indicated by sentences have been developed. Therefore, by applying these technologies, user interfaces (UIs) for enabling various household electrical appliances such as television receivers, information devices such as personal computers, and in-vehicle devices such as car navigation systems to be manipulated by allowing users to input various instructions as natural sentences have become more common. For example, Patent Literature 1 discloses an example of a user interface for enabling various devices to be manipulated by allowing a user to input various instructions as natural sentences.

In addition, in recent years, information devices such as so-called smartphones or tablet terminals capable of adding new functions by installing applications have also become more common. With the multiple functions of such devices, manipulations of selecting the functions are complicated when users execute desired functions. Therefore, convenience of interfaces for executing desired functions in various devices by allowing users to input various instructions as natural sentences has been improved.

CITATION LIST

Patent Literature

Patent Literature 1: JP 2008-47101A

DISCLOSURE OF INVENTION

Technical Problem

On the other hand, expression of natural sentences used daily by users is generally used as means for communication between people, and thus some information is omitted in some cases without consciousness of the users, and some information may be ambiguous. Even in such circumstances, in communication between people, listeners can interpret the intentions of speakers in some cases by supplementing information on the basis of communication flow (context) or background knowledge.

However, in communication between a person and a device, it is difficult to interpret the intentions of a user (for example, a function that the user attempts to cause the device to execute) from expression of natural sentences presented by the user in some cases. In particular, there is a tendency for the difficulty to increase as functions available in the devices increase.

Accordingly, the present disclosure proposes an information processing device, an information processing method, and a program capable of presenting a response to a natural sentence in a more suitable aspect even in circumstances in which a natural sentence with ambiguity can be input.

Solution to Problem

According to the present disclosure, there is provided an information processing device including: circuitry configured to acquire an extraction result of candidates for a response to an input which is based on first information indicating a result of natural language analysis on a natural sentence acquired as the input and second information indicating a state or a situation involved in use of a predetermined device; and a control unit configured to cause a predetermined output unit to present information indicating the candidates for the response in an aspect corresponding to the extraction result of the candidates.

Further, according to the present disclosure, there is provided an information processing method including: acquiring an extraction result of candidates for a response to an input which is based on first information indicating a result of natural language analysis on a natural sentence acquired as the input and second information indicating a state or a situation involved in use of a predetermined device; and causing, by a processor, a predetermined output unit to present information indicating the candidates for the response in an aspect corresponding to the extraction result of the candidates.

Further, according to the present disclosure, there is provided a program causing a computer to execute: acquiring an extraction result of candidates for a response to an input which is based on first information indicating a result of natural language analysis on a natural sentence acquired as the input and second information indicating a state or a situation involved in use of a predetermined device; and causing a predetermined output unit to present information indicating the candidates for the response in an aspect corresponding to the extraction result of the candidates.

Advantageous Effects of Invention

According to the present disclosure, as described above, it is possible to provide an information processing device, an information processing method, and a program capable of presenting a response to a natural sentence in a more suitable aspect even in circumstances in which a natural sentence with ambiguity can be input.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 3 is an example of a control table for weighting reliability calculated for each function.

MODE(S) FOR CARRYING OUT THE INVENTION

Figure 1:
FIG. 1 is an explanatory diagram illustrating an overview of an information processing device according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Also, the description will be made in the following order.
1. Overview
2. Functional configuration
3. Process
4. Hardware configuration
5. Conclusion <1. Overview>

First, an overview of an information processing device according to an embodiment of the present disclosure will be described and a task of the information processing device according to the embodiment will be outlined with reference to FIG. 1. FIG. 1 is an explanatory diagram illustrating an overview of an information processing device 1 according to the embodiment.

When a user inputs various instructions as natural sentences, the information processing device 1 according to the embodiment recognizes instruction content (that is, meaning content indicated by the natural sentences) indicated by the natural sentences from the user. As a specific example, in the example illustrated in FIG. 1, the information processing device 1 recognizes content instructed by the user by acquiring various instructions from the user as sound information and analyzing the acquired sound information on the basis of a sound recognition technology or a natural language processing technology.

In addition, as another example, the information processing device 1 may recognize content instructed by the user, for example, by acquiring text information indicating instruction content input by the user via a keyboard or a touch panel and analyzing the acquired text information on the basis of a natural language processing technology.

Then, the information processing device 1 executes a process in accordance with the recognized instruction from the user and presents an execution result to the user.

Also, the example of the information processing device 1 illustrated in FIG. 1 is merely an example. The type of information processing device 1 is not particularly limited as long as the user can input various instructions as natural sentences. As specific examples, the information processing device 1 may be configured as a so-called personal computer, smartphone, tablet terminal, and wearable terminal. In addition, as another example, the information processing device 1 may be configured as any of so-called various household electrical appliances such as a television receiver.

On the other hand, expression of natural sentences used daily by the user are generally used as means for communication between people, and thus some information is omitted in some cases without consciousness of the users, and some information may be ambiguous.

For example, an example of a natural expression with ambiguity is illustrated in FIG. 1. Specifically, in the example illustrated in FIG. 1, a user Ua instructs the information processing device 1 to show the way to Tokyo Station by uttering a sound indicating instruction content Q10 such as "Tell me how to get to Tokyo Station." On the other hand, the instruction content Q10 such as "Tell me how to get to Tokyo Station" assumes a case in which the user Ua instructs the information processing device 1 to present a route to "Tokyo Station" through a map function or a case in which the user Ua instructs to the information processing device 1 to retrieve a public transportation route to "Tokyo Station" through a transfer guide function.

In addition, as another example, it is assumed that, to play a piece of music of a certain artist (referred to here as "artist Ub"), the user Ua inputs a natural sentence indicating instruction content such as "play artist Ub" to the information processing device 1. In this case, the instruction content such as "play artist Ub" assumes a case in which the user Ua instructs the information processing device 1 to reproduce music of "artist Ub" through a music reproduction function or a case in which the user Ua instructs the information processing device 1 to reproduce a music video featuring the a piece of music of "artist Ub" through a moving image reproduction function. In addition, in this case, a case in which the user Ua instructs the information processing device 1 to reproduce a file stored in the information processing device 1 or a case in which the user Ua instructs the information processing device 1 to reproduce a corresponding moving image or piece of music in which a delivery service for the music or the moving image is used in a streaming manner can also be assumed.

In addition, it is assumed that, to contact a certain person (referred to here as "user Uc"), the user Ua inputs a natural sentence indicating instruction content such as "contact user Uc" to the information processing device 1. In this case, the instruction content such as "contact user Uc" assumes a case in which the user Ua instructs the information processing device 1 to contact the user Uc by telephone, a case in which the user Ua instructs the information processing device 1 to contact the user Uc by mail, or a case in which the user Ua instructs the information processing device 1 to contact the user Uc by a message function provided by a network service such as a social networking service (SNS).

In addition, a case in which instruction content from the user Ua is different depending on a situation can also be assumed. As a specific example, a case in which the user Ua inputs a natural sentence indicating instruction content such as "contact user Uc" will be focused on. The user Ua contacts the user Uc by mail in a certain situation and contacts the user Uc by telephone in another situation. Here, it is assumed that, to contact the user Uc by telephone, the user Ua instructs the information processing device 1 to "contact user Uc." At this time, when the information processing device 1 activates a mail function to contact the user Uc by mail on the basis of the instruction from the user, the user Ua has to execute a complicated correction procedure of stopping the activated mail function and activating a telephone function again.

Accordingly, the information processing device 1 according to the embodiment provides a structure capable of presenting a response in a more suitable aspect in response to a change in a situation or the user and executing a function intended by the user without involving a complicated manipulation even when a natural sentence with ambiguity is input by the user. Hereinafter, the details of the information processing device 1 according to the embodiment will be described.

<2. Functional Configuration>

Figure 2:
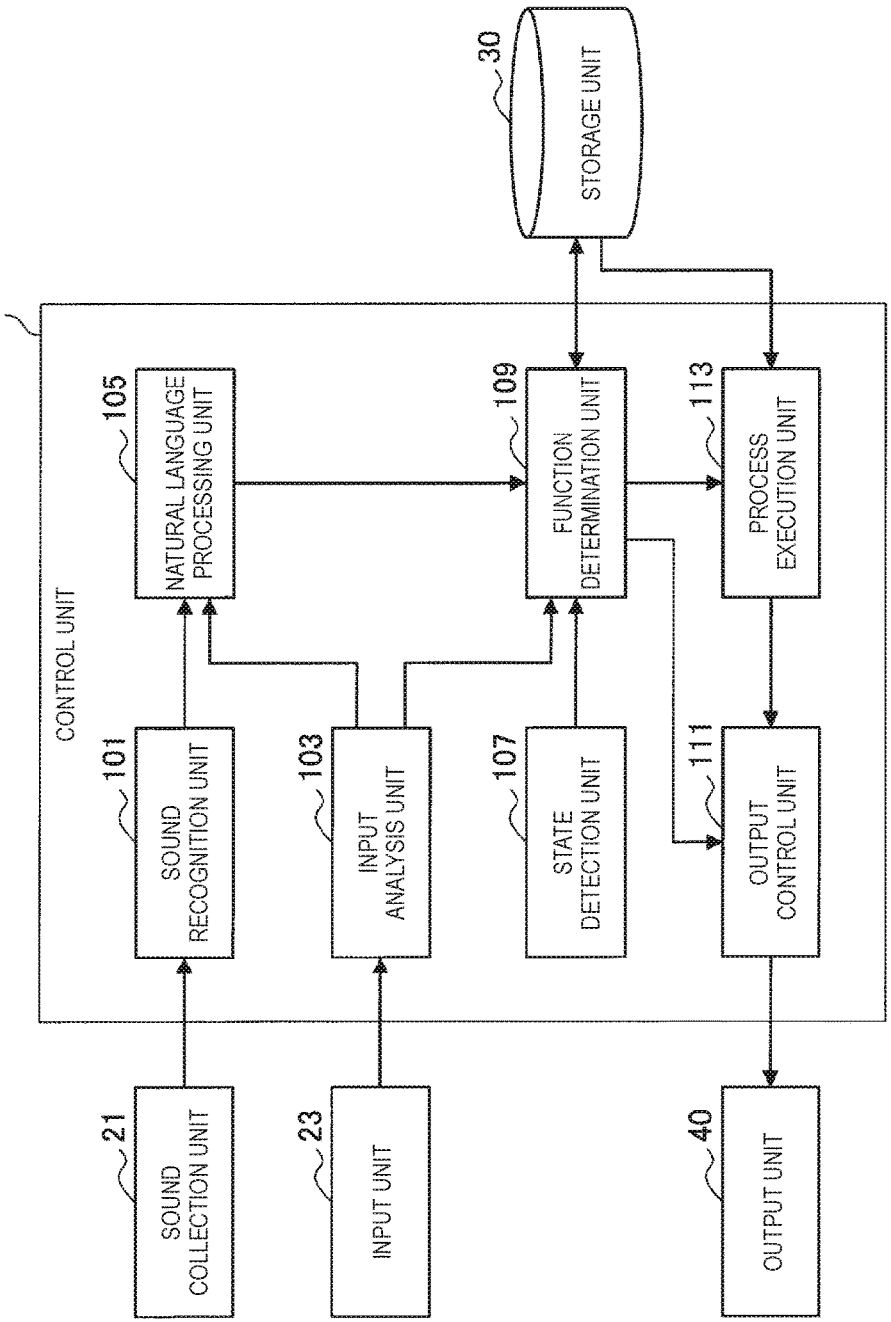
FIG. 2 is a block diagram illustrating an example of a functional configuration of the information processing device according to the embodiment.

In addition, an example of a functional configuration of the information processing device 1 according to the embodiment will be described with reference to FIG. 2. FIG. 2 is a block diagram illustrating an example of the functional configuration of the information processing device 1 according to the embodiment.

As illustrated in FIG. 2, the information processing device 1 according to the embodiment includes a control unit 10, a sound collection unit 21, an input unit 23, a storage unit 30, and an output unit 40.

The sound collection unit 21 is configured to acquire acoustic information regarding a sound input or the like from a user. For example, the sound collection unit 21 can be configured by a sound collection device such as a microphone that collects surrounding acoustic information. The sound collection unit 21 outputs the acquired acoustic information to the control unit 10.

The input unit 23 is an input interface used for the user to execute a desired manipulation on the information processing device 1. For example, the input unit 23 can be configured as a device such as a keyboard used to input text information. In addition, for example, the input unit 23 may be configured as a device such as a touch panel or a pointing device such as a mouse used to designate display information presented on a display or the like. In addition, the input unit 23 may include an input device such as a button or a switch to which a predetermined function is allocated. The input unit 23 receives an input manipulation from the user and outputs control information indicating content of the manipulation to the control unit 10.

The output unit 40 is an output interface used for the information processing device 1 to present information to the user. For example, the output unit 40 can be configured as a device such as a liquid crystal display (LCD) device or an organic EL (organic light emitting diode (OLED)) display that presents presentation target information as display information to the user. In addition, for example, the output unit 40 may be configured as a device such as a speaker that presents predetermined information to the user by outputting an acoustic signal. The output unit 40 presents presentation target information to the user in a predetermined aspect (for example, as display information or acoustic information) on the basis of control from the control unit 10.

The storage unit 30 is configured to store information used for the control unit 10 to be described below to realize various operations. Also, an example of the information stored in the storage unit 30 will be described separately along with content of the control unit 10.

The control unit 10 includes a sound recognition unit 101, an input analysis unit 103, a natural language processing unit 105, a state detection unit 107, a function determination unit 109, an output control unit 111, and a process execution unit 113.

Also, as will be described below, the information processing device 1 according to the embodiment presents candidates for a function of executing a process in accordance with an instruction in accordance with the instruction content indicated by a natural sentence input by the user and executes a function corresponding to the candidate selected by the user among the presented candidates. Accordingly, in the following description, the configuration of the control unit 10 will be divided "Process of presenting candidates in accordance with instruction content" and "Process of receiving selection from user and executing function" in the information processing device 1 and a configuration operated to realize each process will be focused on.

[Process of Presenting Candidates in Accordance with Instruction Content]

First, the description will focus on the configuration of the control unit 10 operating when the information processing device 1 presents function candidates for executing a process in accordance with an instruction in accordance with the instruction content indicated by a natural sentence input by the user.

The sound recognition unit 101 acquires collected acoustic information from the sound collection unit 21. The sound recognition unit 101 detects a sound section from the acquired acoustic information and extracts a portion corresponding to the sound section (that is, an acoustic signal) as a sound input from the acoustic information. The sound recognition unit 101 converts the extracted sound input into text information by analyzing the extracted sound input on the basis of a so-called sound recognition technology. Also, the text information obtained by converting the sound input is equivalent to an example of information input as sound information via the sound collection unit 21 (input as a natural sentence, for example) by the user and indicating instruction content for the information processing device 1. Then, the sound recognition unit 101 outputs the text information obtained by converting the sound input to the natural language processing unit 105.

The input analysis unit 103 acquires control information indicating manipulation content from the input unit 23 (for example, a keyboard). The input analysis unit 103 recognizes content of an input manipulation from the user on the basis of the control information acquired from the input unit 23 and acquires text information input by the user on the basis of a recognition result of content of the input manipulation. The text information is equivalent to an example of information indicating instruction content input via the input unit 23 (input as a natural sentence, for example) by the user and indicating instruction content for the information processing device 1. Then, the input analysis unit 103 outputs the acquired text information to the natural language processing unit 105.

The natural language processing unit 105 acquires the text information indicating the instruction content from the user from at least one of the sound recognition unit 101 and the input analysis unit 103. The natural language processing unit 105 executes analysis (for example, word analysis (morphological analysis), syntax analysis, and semantic analysis) based on a so-called natural language processing technology on the acquired text information (for example, text information input as a natural sentence). Then, the natural language processing unit 105 outputs a result of the analysis based on a natural language processing technology (hereinafter simply referred to as "natural language processing" in some cases) in regard to the text information indicating the instruction content from the user to the function determination unit 109.

The state detection unit 107 is configured to detect various states of the information processing device 1 or various situations in which the information processing device 1 is used. Also, a state of the information processing device 1 or a situation in which the information processing device 1 is used is collectively referred to as a "state of the information processing device 1" in some cases below.

The state detection unit 107 may detect a network state (for example, a connection situation), for example, by monitoring a network between the information processing device 1 and an external device. In addition, the state detection unit 107 may recognize a situation (or a state) in which the information processing device 1 is used on the basis of various pieces of detected information. As a specific example, the state detection unit 107 may recognize a situation in which the information processing device 1 is used in accordance with a type of network to which the information processing device 1 is connected. In this case, when the information processing device 1 is connected to a so-called home network, the state detection unit 107 may recognize that the information processing device 1 is used indoors. In addition, when the information processing device 1 is connected to a so-called in-vehicle network, the state detection unit 107 may recognize that the information processing device 1 is used inside an automobile.

In addition, as another example, the state detection unit 107 may detect a state of a battery (not illustrated) supplying power to operate the information processing device 1 by monitoring a state (for example, a remaining amount of charged power) of the battery.

Also, the above-described states of the information processing device 1 (that is, device states) detected (or recognized) by the state detection unit 107 are merely examples. The kind of detected states or a method of detecting the states is not particularly limited.

For example, the state detection unit 107 may recognize situations (or states) in which the information processing device 1 is used in accordance with detection results of various detection devices, such as various sensors such as an acceleration sensor or an angular velocity sensor or a position detection device such as a Global Positioning System (GPS) receiver.

As a specific example, the state detection unit 107 may estimate a motion of a user (for example, whether the user is moving or not) on the basis of a detection result of a change in a motion or a direction of the casing of the information processing device 1 obtained by an acceleration sensor or an angular velocity sensor. In addition, at this time, the state detection unit 107 may estimate moving means (for example, walking, an electric train, or an automobile) of the user who is moving on the basis of a pattern of a detected motion (for example, vibration) of the casing of the information processing device 1.

In addition, as another example, the state detection unit 107 may recognize whether the user is moving or not in accordance with a detection result of the position of the information processing device 1 by GPS. In addition, at this time, the state detection unit 107 may estimate moving means of the user on the basis of a recognized moving route of the user. As a specific example, when it is recognized that the user is moving along a line of an electric train, the state detection unit 107 may recognize that the user is moving by electric train.

Of course, it is needless to say that the state detection unit 107 may recognize a situation (or a state) in which the information processing device 1 is used by combining detection results of a plurality of detection devices.

In this way, the state detection unit 107 detects various states of the information processing device 1 and outputs control information indicating the detected states of the information processing device 1 to the function determination unit 109.

The function determination unit 109 acquires a result of the natural language processing on the text information indicating the instruction content from the user from the natural language processing unit 105. Also, the result of the natural language processing is equivalent to an example of "first information." The function determination unit 109 extracts a function supposed to be requested by text information (a natural sentence) indicating instruction content from the user on the basis of the acquired result of the natural language processing.

As a specific example, the function determination unit 109 extracts a function supposed to be requested by text information (a natural sentence) indicating the instruction content from the user on the basis of a so-called supervised document classification problem which is based on training data accumulated on the basis of machine learning using the acquired result of the natural language processing as an input. In this case, for example, the function determination unit 109 calculates reliability that each target function (for example, an installed function or an installable function) is a function requested on the basis of the instruction content from the user by comparing the acquired result of the natural language processing to the training data.

As a more specific example, the function determination unit 109 may calculate reliability of each function by comparing a combination of keywords included in the instruction content to training data indicating a history of functions executed in the past on the basis of the combination of the keywords.

Of course, the foregoing method of calculating the reliability is merely an example. The method is not particularly limited as long as the foregoing reliability can be calculated for each target function on the basis of the result of the natural language processing and the training data.

Also, the function determination unit 109 may cause the storage unit 30 to store the fact that the training data to be used to extract a function is generated in advance. In addition, the function determination unit 109 may generate or update the training data. In this case, the function determination unit 109 may cause the storage unit 30 to store the result of the natural language processing obtained in regard to the text information indicating the instruction content from the user and information indicating the function executed in correspondence with the instruction content as training data in association therewith. Also, an operation when the function determination unit 109 generates or updates the training data will be described below separately as "Process of receiving selection from user and executing function."

In addition, the function determination unit 109 may control the reliability by weighting reliability calculated for each function on the basis of information, such as a state of the information processing device 1 (that is, a device state), a situation in which the information processing device 1 is used, and past execution histories of various functions, indicating a state or a situation involved in use of the information processing device 1. Also, the information indicating the state or the situation involved in the use of the information processing device 1 is equivalent to an example of "second information."

For example, FIG. 3 illustrates an example of a control table d10 used for the function determination unit 109 to weight reliability calculated for each function on the basis of information indicating a state or situation involved in use of the information processing device 1.

In FIG. 3, reference numerals d111 to d115 denote examples of various functions which can be extraction targets.

Specifically, reference numeral d111 denotes an example of a function which can be used for the user to contact another user. For example, a function such as "telephone" for executing synchronous contact (in real time) or a function such as "electronic mail" or "message function" enabling asynchronous contact can be exemplified.

In addition, reference numeral d113 denotes an example of a function of reproducing a piece of music or a moving image. For example, a "music reproduction" function or "moving image reproduction" function can be exemplified. In addition, as the function of reproducing a piece of music or a moving image, a function of reproducing files (a library) stored in the information processing device 1 or a function of executing streaming reproduction using a delivery service of music or a moving image can be exemplified.

In addition, reference numeral d115 denotes an example of a function of presenting the way to a destination. For example, a "map" function of presenting a route to a destination or a "transfer guide" function of searching for a public transportation route to a destination can be exemplified.

In addition, reference numerals d121 to d125 denote examples of information indicating states or situations involved in use of the information processing device 1 to control reliability calculated for each function.

Specifically, reference numeral d121 denotes an example of information indicating various states of the information processing device 1. As the information d121 indicating various states of the information processing device 1, for example, information such as a "remaining battery amount (that is, a remaining amount of charged power)" indicating a battery state and information such as "communication environment" indicating a network state (for example, a connection state to a network such as the Internet) in which the information processing device 1 communicates with an external device can be exemplified.

In addition, reference numeral d123 denotes an example of information indicating a situation in which the information processing device 1 is used. As the situation in which the information processing device 1 is used, for example, a situation in which the information processing device 1 is used "indoors" or a situation in which the information processing device 1 is used "inside an automobile" can be assumed.

Also, the function determination unit 109 may acquire the information d121 indicating various states of the information processing device 1 or the information d123 indicating a situation in which the information processing device 1 is used as control information indicating various states of the information processing device 1 from the state detection unit 107.

In addition, reference numeral d125 indicates an example of information which is based on past execution histories of various functions. As a specific example of the information d125 which is based on the past execution histories of various functions, a history of parameters used to execute the function can be exemplified. In the example illustrated in FIG. 3, examples of the information indicating a user used as destinations such as "telephone," "electronic mail," and "message function" can be exemplified as the parameters used to execute various functions.

Of course, the examples illustrated in FIG. 3 are merely examples. The types of information d125 are not particularly limited as long as the information can be acquired on the basis of past execution histories of various functions. As a specific example, information indicating dates on which various function are executed may be used as the information d125 which is based on the past execution histories of various functions. In addition, as another example, positional information regarding the information processing device 1 (in other words, positional information regarding the user) when various functions are executed may be used as the information d125 which is based on the past execution histories of various functions.

Also, in regard to the information d125 which is based on the past execution histories of various functions, the function determination unit 109 may accumulate information indicating a function executed in correspondence with instruction content from the user in advance in the storage unit 30 as history information.

In this way, the function determination unit 109 can acquire the information indicating a state or a situation involved in use of the information processing device 1.

Next, an example of a case in which the function determination unit 109 controls reliability calculated for each function on the basis of the acquired information indicating a state or a situation involved in use of the information processing device 1 will be described with reference to FIG. 3 by giving a specific example.

First, an example of an operation related to control of the reliability by the function determination unit 109 will be described focusing on the function d111 such as "telephone," "electronic mail," and "message function" used for the user to contact another user.

For example, the function determination unit 109 performs control such that the reliability of the function such as "telephone" for executing synchronous contact (in real time) is lower when the information processing device 1 is not connected to a network (that is, the network is disconnected) on the basis of the information indicating "communication environment." Thus, priority of the function such as "electronic mail" or "message function" enabling asynchronous contact is relatively higher than the function such as "telephone" for executing synchronous contact. In particular, in the example illustrated in FIG. 3, the function determination unit 109 performs control such that "telephone" is not extracted by setting "−100" as the reliability of "telephone" when the network is disconnected.

In addition, in a situation in which the information processing device 1 is used inside an "automobile," the function determination unit 109 may perform control such that the reliability of a function which can be used in a hands-free manner such as "telephone" is higher. In addition, in this case, the function determination unit 109 may perform control such that the reliability of a function involving a user manipulation such as a text input as in "electronic mail" and "message function" is lowered.

In addition, the function determination unit 109 may control the reliability of each function in accordance with a user who is a recipient on the basis of the past execution history of each function such as "telephone," "electronic mail," or "message function."

For example, it is assumed that the user Ua of the information processing device 1 uses "telephone" most frequently and uses "message function" next most frequently when the user Ua contacts another user Uc. In this case, the function determination unit 109 controls the reliability of each function such that the reliability of "telephone" or "message function" is higher than the reliability of other functions (for example, "electronic mail") when a recipient is the user Uc. In addition, at this time, the function determination unit 109 may control the reliability of each function such that the reliability of "telephone" is higher than the reliability of "message function."

In addition, as another example, it is assumed that the user Ua of the information processing device 1 uses only "message function" when the user Ua contacts another user Ud. In this case, the function determination unit 109 may control the reliability of each function such that the reliability of "message function" is higher than the reliability of other functions (for example, "telephone" or "electronic mail") when a recipient is the user Uc.

Also, when the function determination unit 109 controls the reliability of each function on the basis of the past execution history of each function, the function determination unit 109 may determine whether to control the reliability of the function in consideration of the frequency of use of the function. Specifically, the function determination unit 109 may control the reliability of only a function of which the number of times the function is executed exceeds a threshold on the basis of the past execution history of each function. In this configuration, for example, the function determination unit 109 can also perform control such that the reliability of a function of which the frequency of use by the user is higher and a function temporarily used by the user is excluded from reliability control targets.

Next, an example of an operation related to reliability control by the function determination unit 109 will be described focusing on the function d111 of reproducing a piece of music or a moving image, such as "music reproduction (library)," "music reproduction (streaming)," "moving image reproduction (library)," and "moving image reproduction (streaming)."

For example, the function determination unit 109 may control the reliability of each function such that the reliability of a function is lower as the function consumes more power when power charged in a battery is less than a threshold on the basis of the information indicating "remaining battery amount." For example, more power is consumed when a moving image is reproduced than when a piece of music is reproduced. Therefore, in the example illustrated in FIG. 3, the function determination unit 109 controls the reliability of each function such that the reliability of the function "moving image reproduction" is lower than that of the function "music reproduction." In addition, a streaming reproduction function involving communication at the time of reproduction of a piece of music or a moving image consumes more power than a function of reproducing files (a library) in the information processing device 1 since transmission and reception of information via communication is involved. Therefore, the function determination unit 109 controls the reliability of each function such that the reliability of the streaming reproduction function is lower than the function of reproducing a file in the information processing device 1.

In addition, for the function of "music reproduction (streaming)" or "moving image reproduction (streaming)," it is necessary to acquire a piece of music or a moving image to be reproduced from a server via a network. Therefore, when the information processing device 1 is not connected to the network (that is, the network is disconnected) on the basis of information indicating "communication environment," the function determination unit 109 may perform control such that the reliability of the streaming reproduction function is lower. In particular, in the example illustrated in FIG. 3, when the network is disconnected, the function determination unit 109 performs control such that the streaming reproduction function is not extracted by setting "−100" in the reliability of "music reproduction (streaming)" and "moving image reproduction (streaming)."

Next, an example of an operation related to control of the reliability by the function determination unit 109 will be described focusing on the function d115 such as "map" and "transfer guide" of presenting the way to a destination.

For example, the function such as "map" of presenting the way to a destination consumes more power than a so-called retrieval function such as "transfer guide" in some cases. Therefore, the function determination unit 109 controls the reliability of each function such that the reliability of the function of "map" is lower than the function of "transfer guide" when power charged in a battery is less than a threshold on the basis of the information indicating "remaining battery amount."

In addition, when communication via a network is assumed in the function of "map" or "transfer guide," the function determination unit 109 may control the reliability of the function on the basis of the information indicating "communication environment." For example, in the example illustrated in FIG. 3, when a network is disconnected, the function determination unit 109 performs control such that the function is not extracted by setting "−100" in the reliability of the function such as "map" and "transfer guide" in which the communication via the network is assumed.

In addition, when the information processing device 1 is used inside an automobile, a frequency of situations in which the user confirms a route to a destination is more and a frequency of situations in which the user searches for a public transportation route as the way to the destination is less. Therefore, in the example illustrated in FIG. 3, the function determination unit 109 performs control such that the reliability of the function of "map" is higher than the function of "transfer guide" in the situation in which the information processing device 1 is used inside an automobile.

Also, when the information processing device 1 is used inside an electric train, it is assumed that a frequency of situations in which the user searches for a public transportation route to a destination is more and a frequency of situations in which the user confirms a route to the destination as the way to the destination is less. Therefore, the function determination unit 109 may perform control such that the reliability of the function of "transfer guide" is higher than the reliability of the function of "map" in a situation in which the information processing device 1 is used inside an electric train.

Of course, the foregoing operation related to the control of the reliability by the function determination unit 109 is merely an example and the present disclosure is not necessarily limited to the example described above.

For example, the function determination unit 109 may control the reliability of each function in accordance with a date or a period of time in which information (for example, a sound input or text information) indicating instruction content from the user is acquired. For example, a user whose daily behavior pattern is periodic uses a specific function in accordance with a day of the week or a period of time in some cases. As a specific example, it is assumed that a certain user gets up at the same hour in the morning on weekdays, commutes using a specific electric train, and uses a "news reader function" to confirm news during movement in the electric train. In such a situation, when information indicating instruction content "checking news" is input by the user in a period of time of the morning, the function determination unit 109 may perform control such that the reliability of "news reader function" is higher.

In addition, the function determination unit 109 may control the reliability of each function in accordance with positional information regarding the information processing device 1 (in other words, positional information regarding the user) when information (for example, a sound input or text information) indicating instruction content from the user is acquired. As a specific example, when information indicating instruction content such as "How to get to Tokyo Station" is input and the user is located near Tokyo Station, the function determination unit 109 may perform control such that the reliability of the function of "map" is higher so that the user can confirm a route to Tokyo Station. In addition, when the user is not located near Tokyo Station, the function determination unit 109 may perform control such that the reliability of the function of "transfer guide" is higher so that the user can search for a public transportation route from a nearby station to Tokyo Station.

In this way, the function determination unit 109 may control the reliability calculated for each function on the basis of the acquired information indicating a state or a situation involved in use of the information processing device 1.

When the reliability is calculated for each function, the function determination unit 109 extracts a function supposed to be requested by text information (a natural sentence) indicating instruction content from the user on the basis of the reliability calculated for each function. As a specific example, the function determination unit 109 may extract only a function of which the reliability exceeds a threshold. In addition, as another example, the function determination unit 109 may extract a pre-decided number of functions of which the reliability is higher. Also, the function determination unit 109 can be equivalent to an example of an "extraction unit."

Then, the function determination unit 109 outputs information indicating each function extracted on the basis of a result of the natural language processing on the text information indicating the instruction content from the user and information indicating the reliability corresponding to the function to the output control unit 111.

The output control unit 111 acquires information indicating each of the functions extracted as candidates for a response to the instruction content from the user and information indicating reliability showing that the function is a function requested on the basis of the instruction content from the user from the function determination unit 109. The output control unit 111 presents the functions extracted as the candidates for the response to the instruction content from the user to the user by outputting the information indicating each of the acquired functions to the output unit 40.

Figure 4:
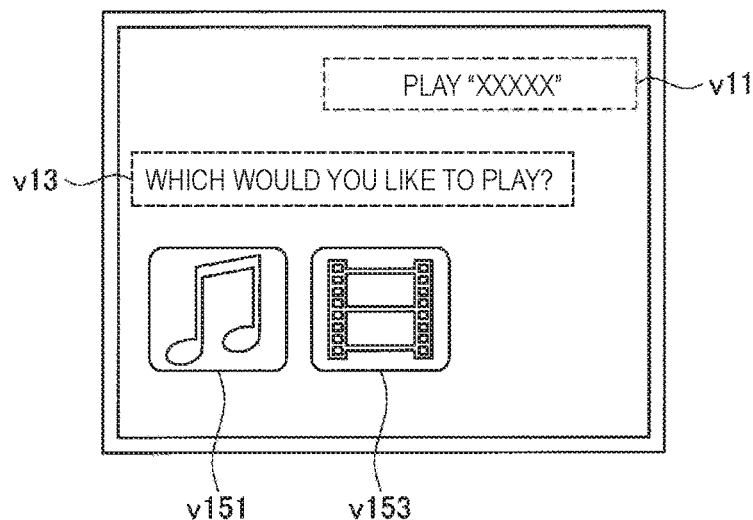
FIG. 4 is a diagram illustrating an example of a display screen.

For example, FIG. 4 is a diagram illustrating an example of a display screen output by the information processing device 1. FIG. 4 illustrates an example of a case in which the information processing device 1 presents each of the functions extracted as candidates for a response to instruction content from the user as display information to the user.

In the example illustrated in FIG. 4, the output control unit 111 presents display information v11 indicating instruction content from the user on a display screen v10 and presents display information v151 and v153 indicating the functions extracted as candidates for a response to the instruction content to the user so that the user can select the display information. For example, in the example illustrated in FIG. 4, the output control unit 111 presents the information v151 and v153 indicating the functions extracted as the candidates for the response to the instruction content as icons indicating the functions.

In addition, at this time, the output control unit 111 may present display information v13 (for example, report information such as a message) prompting the user to select the presented display information corresponding to a function desired by the user between the pieces of display information v151 and v153 indicating the functions along with the display information v151 and v153.

In addition, the output control unit 111 may control an output aspect of the display information indicating each of the functions extracted as the candidates for the response to the instruction content in accordance with the reliability corresponding to each of the functions. As a specific example, the output control unit 111 may control a presentation order of the display information corresponding to the functions so that the display information indicating the function with the higher reliability is more preferentially displayed (for example, the user can select the display information more easily) in accordance with the reliability corresponding to each function.

Figure 5:
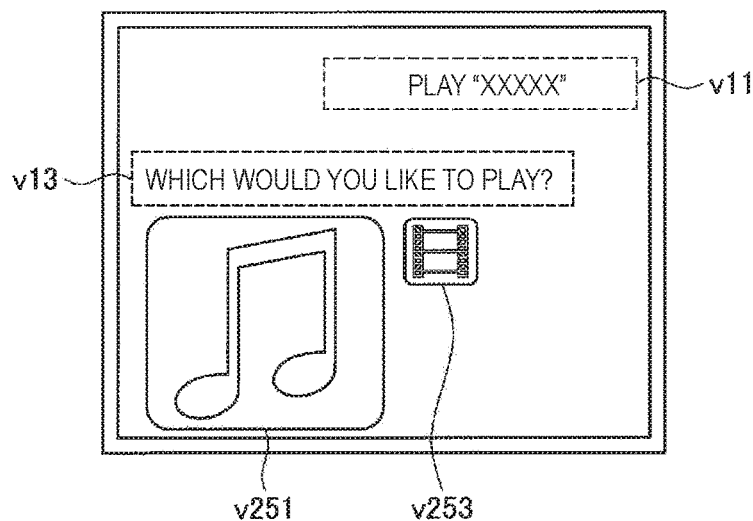
FIG. 5 is a diagram illustrating an example of a display screen.

In addition, as another example, the output control unit 111 may present the display information so that the reliability corresponding to each of the functions can be identified when the display information indicating each function is presented. For example, FIG. 5 is a diagram illustrating an example of a display screen output by the information processing device 1. FIG. 5 illustrates an example of a case in which the information processing device 1 presents the display information so that the reliability corresponding to each function can be identified.

In the example illustrated in FIG. 5, the output control unit 111 controls the sizes of the display information in accordance with the reliability of the corresponding functions as output aspects of the display information v251 and v253 (for example, icons) indicating the functions. Specifically, FIG. 5 illustrates an example of a display screen v20 when the reliability of the function of "music reproduction" for reproducing a piece of music is set to be higher than the reliability of the function of "moving image reproduction" for reproducing a moving image. In this case, the output control unit 111 controls the display aspects of the display information v251 and v253 so that the display information v251 corresponding to the function of "music reproduction" is displayed larger than the display information v253 corresponding to the function of "moving image reproduction."

In addition, the output control unit 111 may also present information indicating the basis of the reliability corresponding to each function to the user. As a specific example, when control is performed such that the reliability of some of the functions is lowered with a reduction in a remaining battery amount, the output control unit 111 may report, to the user, information indicating that the priority of a function consuming power more is lowered with the reduction in the remaining battery amount. Also, the output control unit 111 may generate the information indicating the basis of the reliability corresponding to each function on the basis of information (for example, a state of the information processing device 1, a situation in which the information processing device 1 is used, and past execution histories of various functions) used to control the reliability of each function by acquiring the information from the function determination unit 109.

Also, the foregoing example is merely an example and the method is not particularly limited as long as the output control unit 111 can control the display aspect of the display information corresponding to each function in accordance with the reliability corresponding to the function. As a specific example, the output control unit 111 may control color of the display information corresponding to each function such that the display information corresponding to the function with higher reliability is more emphasized.

In addition, in the above-described example, the example in which the output control unit 111 presents the information corresponding to each of the extracted functions as the display information to the user has been described. The kind of information indicating the function to be output is not particularly limited as long as the user can recognize each of the extracted functions. As a specific example, the output control unit 111 may present the information corresponding to each of the extracted functions as sound information to the user. In this case, the output unit 40 may be configured as an acoustic device, such as a so-called speaker, that outputs acoustic information.

In this way, the information processing device 1 presents the candidates for a function of executing a process in accordance with an instruction to the user via the output unit 40 in accordance with instruction content indicated by a natural sentence input by the user. Thus, the user can select a function which the user causes the information processing device 1 to execute among the functions presented by the information processing device 1.

[Process of Receiving Selection from User and Executing Function]

Next, the description will focus on the configuration of the control unit 10 operating when the information processing device 1 receives selection of an extraction result of each function from the user and executes a function selected by the user. Also, in the description, the detailed description of the same operation as the operation when the information processing device 1 presents candidates for a function of executing a process in accordance with an instruction from the user will be omitted.

When the user selects information corresponding to a desired function via the input unit 23 (for example, a touch panel) from information (for example, display information) indicating functions presented by the information processing device 1, control information indicating content of a manipulation related to the selection is output to the input analysis unit 103 from the input unit 23. The input analysis unit 103 recognizes the manipulation content of the user on the basis of the control information acquired from the input unit 23 and recognizes the information selected by the user (that is, the information corresponding to the function desired by the user) among the information indicating the functions in accordance with the recognized manipulation content.

As a specific example, it is assumed that the user executes selection by touching display information v151 via the input unit 23 configured as a touch panel between the pieces of display information v151 and v153 corresponding to the functions displayed on the display screen v10 illustrated in FIG. 4.

In this case, information indicating a touch position on the screen is output from the input unit 23 to the input analysis unit 103. The input analysis unit 103 recognizes that the display information v151 is selected by the user by combining the touch position on the screen acquired from the input unit 23 and positional information of each piece of display information on the screen. Also, the input analysis unit 103 may recognize the positional information of each piece of display information on the screen, for example, by acquiring corresponding information (for example, information for outputting the screen) from the output control unit 111. Then, the input analysis unit 103 outputs information indicating the function corresponding to the display information v151 selected by the user, that is, information indicating the function selected by the user, to the function determination unit 109.

In addition, the configuration of the input unit 23 is not necessarily limited to the touch panel as long as the touch position of the user can be detected. As a specific example, the input unit 23 may be configured as a pointing device such as a mouse. In addition, as another example, the input unit 23 may include an imaging unit that captures an image and recognizes manipulation content (for example, a touch position) of the user on the basis of an analysis result of an image by imaging an operation (for example, a touch manipulation) related to a manipulation of the user as an image.

In addition, as another example, it is assumed that the user inputs information corresponding to a desired function by a sound among information corresponding to the functions presented by the information processing device 1. In this case, the sound recognition unit 101 converts a sound input by the user into text information on the basis of a sound recognition technology and outputs the text information to the natural language processing unit 105. The natural language processing unit 105 recognizes meaning content of the text information by acquiring the text information indicating instruction content from the user from the sound recognition unit 101 and analyzing the acquired text information based on the natural language processing technology. Then, the natural language processing unit 105 outputs a result of the natural language processing on the text information indicating the instruction content from the user, that is, information indicating the function selected by the user, to the function determination unit 109.

The function determination unit 109 acquires the information indicating the function selected by the user from the input analysis unit 103 or the natural language processing unit 105. Also, the function selected by the user can be equivalent to one function among the functions extracted previously by the function determination unit 109 in accordance with the instruction content indicated by the natural sentence input by the user, as described as "Process of presenting candidates in accordance with instruction content."

Subsequently, the function determination unit 109 extracts a parameter (in other words, a key phrase) used to execute the function selected by the user on the basis of the previously acquired result of the natural language processing on the text information indicating the instruction content of the user. For example, when the selected function is the function of "map" or "transfer guide," the function determination unit 109 extracts a key phrase indicating a destination as a parameter for executing the function on the basis of the acquired result of the natural language processing.

Also, the function determination unit 109 may extract the key phrase in advance. Specifically, the function determination unit 109 may extract the key phrase in regard to each of the extracted functions when each function is extracted in accordance with the instruction content indicated by the natural sentence input by the user.

Then, the function determination unit 109 outputs the information indicating the function selected by the user and information indicating the parameter (key phrase) for executing the function to the process execution unit 113.

In addition, at this time, the function determination unit 109 may accumulate a combination of the previously acquired information indicating the instruction content from the user (for example, the result of the natural language processing on the text information indicating the instruction content) and the information indicating the function selected by the user as training data in the storage unit 30. Similarly, the function determination unit 109 may accumulate the information indicating the function selected by the user as history information in the storage unit 30 in combination with information indicating various states (for example, information indicating a state of the information processing device 1, a date, a position, and the like). In this configuration, the function determination unit 109 can extract a function close to an intention of the user in accordance with the instruction content from the user.

The process execution unit 113 reads data (for example, a library) for executing a function (for example, an application) designated by the function determination unit 109 from a predetermined storage region. Also, data for executing each function may be stored in, for example, the storage unit 30. Of course, a location in which the data is stored is not particularly limited as long as the process execution unit 113 can read the data for executing each function.

Also, at this time, when the designated function is not installed in the information processing device 1, the process execution unit 113 may install the function in the information processing device 1. In addition, at this time, for example, the process execution unit 113 may access a server via a network and acquire (download) data necessary to install the function from the server. In addition, at this time, the process execution unit 113 determines whether to install a corresponding function by causing the output control unit 111 to output information for confirming whether to install the function and receiving an instruction from the user.

Then, the process execution unit 113 executes the function designated using the acquired parameter as an input on the basis of the read data and outputs an execution result of the function to the output control unit 111.

The output control unit 111 acquires an execution result of the function selected by the user from the process execution unit 113 and presents information indicating the execution result to the user via the output unit 40.

Also, in the foregoing example, the example in which the information processing device 1 presents the information (for example, the display information) indicating the functions extracted in accordance with the instruction content from the user as the candidates for the response to the instruction content and executes the function corresponding to the candidate selected by the user has been described. On the other hand, when a function corresponding to the instruction content from the user is uniquely specified, the information processing device 1 may directly execute the function and present an execution result to the user.

In this case, the function determination unit 109 outputs information indicating the extracted function and information indicating a parameter (key phrase) for executing the function to the process execution unit 113.

The process execution unit 113 reads data (for example, a library) for executing a function (for example, an application) designated from the function determination unit 109 from the storage unit 30. The process execution unit 113 executes a function designated using the acquired parameter as an input on the basis of the read data and outputs an execution result of the function to the output control unit 111.

Then, the output control unit 111 may acquire the execution result of the function selected by the user from the process execution unit 113 and present the information indicating the execution result to the user via the output unit 40.

Figure 6:
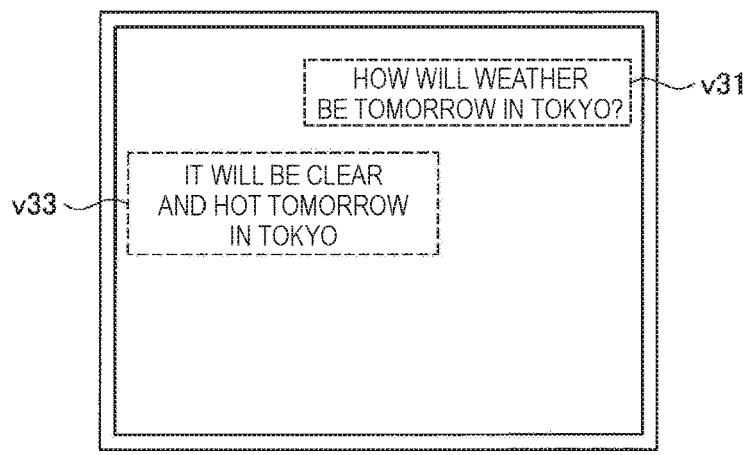
FIG. 6 is a diagram illustrating an example of a display screen.

For example, FIG. 6 is a diagram illustrating an example of a display screen output by the information processing device 1. FIG. 6 illustrates an example of a case in which the information processing device 1 executes a function and presents an execution result to the user when a function corresponding to instruction content from the user is uniquely specified. That is, the output control unit 111 presents display information v31 indicating the instruction content from the user and display information v33 indicating an execution result of the function uniquely specified in accordance with the instruction content on a display screen v30.

The examples of the functional configurations of the information processing device 1 according to the embodiment have been described with reference to FIGS. 2 to 6. Also, in the foregoing examples, the example in which the user selects the function by executing a touch manipulation or a sound input has been described. However, the configuration or the method of selecting a function is not particularly limited as long as the user can select a desired function. As a specific example, the information processing device 1 may be configured such that a user can select a desired function on the basis of a visual line input. In this case, for example, the information processing device 1 may detect a blink of the user and recognize that information (function) presented at a destination of the visual line of the user at the time of detection of the blink is selected.

Also, the above-described functional configuration of the information processing device 1 is merely an example and the configuration is not necessarily limited as long as each of the above-described functions can be realized. As a specific example, at least one of the sound collection unit 21, the input unit 23, and the output unit 40 may be installed outside of the information processing device 1. In addition, a part of the configuration of the control unit 10 may be installed outside of the information processing device 1.

In addition, the control unit 10 may be installed in a so-called server or the like. In this case, the server may acquire information indicating instruction content from the user from a terminal connected via a network and present a process result (for example, information indicating an extracted function) which is based on the instruction content to the user via the terminal.

<3. Process>

Figure 7:
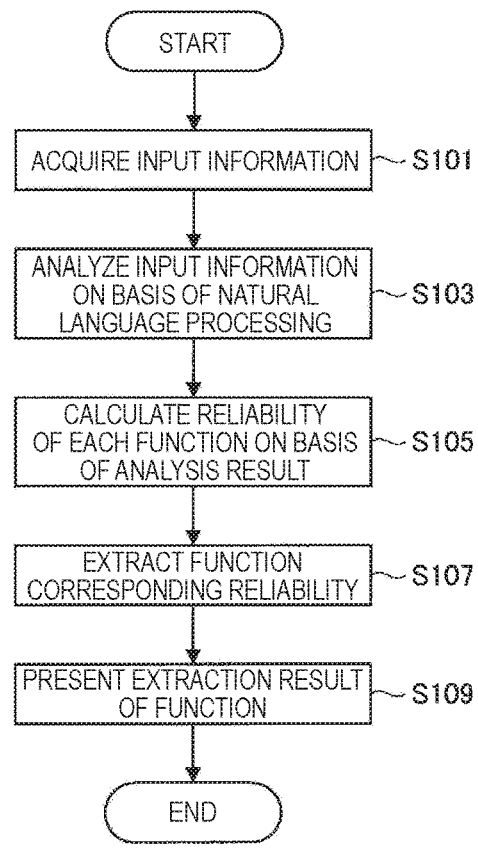
FIG. 7 is a flowchart illustrating an example of the flow of a series of operations of the information processing device according to the embodiment.
Figure 8:
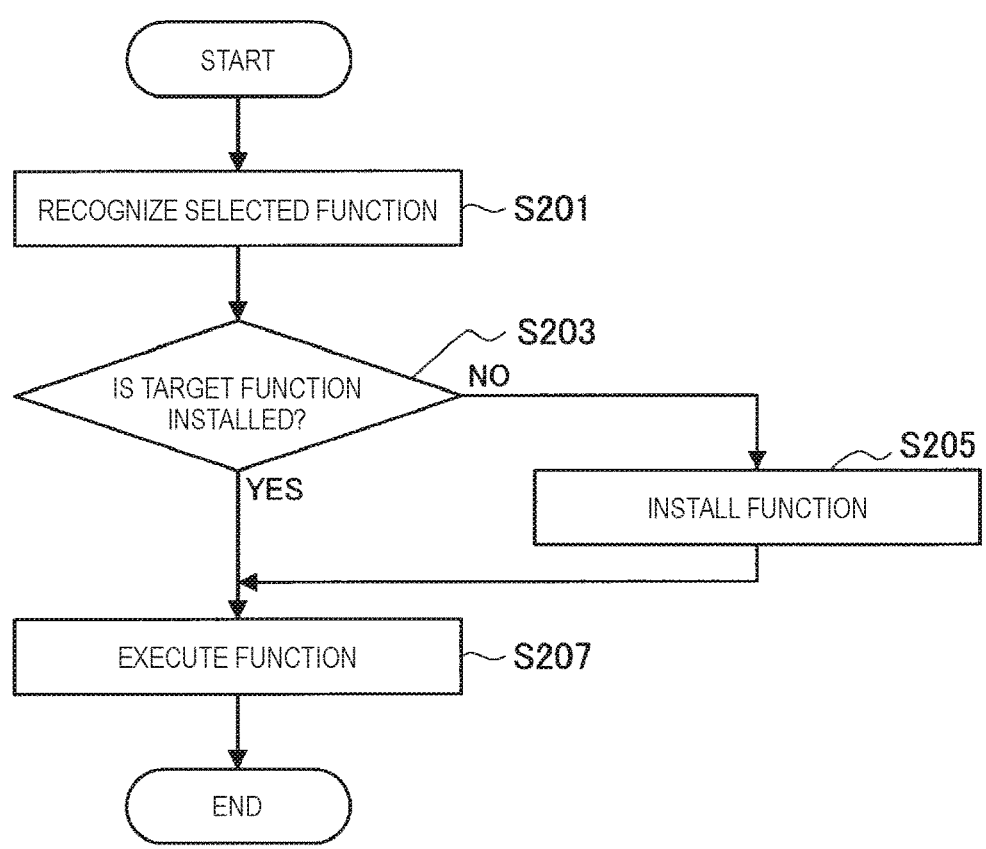
FIG. 8 is a flowchart illustrating an example of the flow of a series of operations of the information processing device according to the embodiment.

Next, an example of the flow of a series of operations of the information processing device 1 according to the embodiment will be described with reference to FIGS. 7 and 8. FIGS. 7 and 8 are flowcharts illustrating an example of the flow of a series of operations of the information processing device 1 according to the embodiment. Also, in the description, an operation of the information processing device 1 is divided into "Process of presenting candidates in accordance with instruction content" and "Process of receiving selection from user and executing function."

[Process of Presenting Candidates in Accordance with Instruction Content]

In addition, an example of the flow of a process in which the information processing device 1 presents candidates for a function of executing a process in accordance with an instruction in accordance with instruction content indicated by a natural sentence input by the user will be described with reference to FIG. 7.

(Step S101)

When the user inputs an instruction to the information processing device 1 by a sound, the acoustic information such as a sound input by the user is acquired by the sound collection unit 21. The sound collection unit 21 outputs the acquired acoustic information to the control unit 10.

The sound recognition unit 101 of the control unit 10 acquires the collected acoustic information from the sound collection unit 21. The sound recognition unit 101 detects a sound section from the acquired acoustic information and extracts a portion (that is, an acoustic signal) equivalent to the sound section from the acoustic information as a sound input. The sound recognition unit 101 converts the extracted sound input into the text information by analyzing the sound input on the basis of the so-called sound recognition technology. Then, the sound recognition unit 101 outputs the text information obtained by converting the sound input to the natural language processing unit 105.

In addition, when the user inputs text information indicating instruction content to the information processing device 1 via the input unit 23 configured as a device such as a keyboard that inputs text information, the input unit 23 outputs control information indicating manipulation content to the control unit 10.

The input analysis unit 103 of the control unit 10 acquires the control information indicating the manipulation content from the input unit 23 (for example, a keyboard). The input analysis unit 103 recognizes content of an input manipulation by the user on the basis of the control information acquired from the input unit 23 and acquires the text information input by the user on the basis of a recognition result of the content of the input manipulation. Then, the input analysis unit 103 outputs the acquired text information to the natural language processing unit 105.

(Step S103)

The natural language processing unit 105 acquires the text information indicating the instruction content from the user from at least one of the sound recognition unit 101 and the input analysis unit 103. The natural language processing unit 105 executes the so-called natural language processing on the acquired text information. Then, the natural language processing unit 105 outputs a result of the natural language processing on the text information indicating the instruction content from the user to the function determination unit 109.

(Step S105)

The function determination unit 109 acquires the result of the natural language processing on the text information indicating the instruction content from the user from the natural language processing unit 105. The function determination unit 109 calculates the reliability showing that the function is a function requested on the basis of the instruction content from the user in regard to each of the target functions by comparing the acquired result of the natural language processing to the training data accumulated on the basis of machine learning.

In addition, the function determination unit 109 may control the reliability by weighting the reliability calculated for each function on the basis of information indicating a state or a situation involved in use of the information processing device 1, such as a state of the information processing device 1, a situation in which the information processing device 1 is used, and past execution histories of various functions.

Also, the function determination unit 109 may acquire information indicating various states of the information processing device 1, such as a state of the information processing device 1 or a situation in which the information processing device 1 is used, from the state detection unit 107. In addition, the function determination unit 109 may accumulate information indicating a function executed in correspondence to the instruction content from the user as history information in the storage unit 30 in advance and use the accumulated history information as the past execution histories of various functions.

(Step S107)

The function determination unit 109 extracts a function supposed to be requested by the text information (natural sentence) indicating the instruction content from the user on the basis of the reliability calculated for each function when the reliability is calculated for each function. As a specific example, the function determination unit 109 may extract only a function of which the reliability exceeds a threshold. In addition, as another specific example, the function determination unit 109 may extract a pre-decided number of functions of which the reliability is higher.

Then, the function determination unit 109 outputs the information indicating each function extracted on the basis of the result of the natural language processing on the text information indicating the instruction content from the user and the information indicating the reliability corresponding to the function to the output control unit 111.

(Step S109)

The output control unit 111 acquires the information indicating each of the functions extracted as the candidates for the response to the instruction content from the user and the information indicating the reliability showing the function is the function requested on the basis of the instruction content from the user from the function determination unit 109. The output control unit 111 presents the functions extracted as the candidates for the response to the instruction content from the user to the user by outputting the information indicating each of the acquired functions to the output unit 40.

In addition, the output control unit 111 may control the output aspect of the display information indicating each of the functions extracted as the candidates for the response to the instruction content in accordance with the reliability corresponding to each of the functions. As a specific example, the output control unit 111 may control the presentation order of the display information corresponding to each function so that the display information indicating the function with the higher reliability is more preferentially displayed (for example, the user can select the display information more easily) in accordance with the reliability corresponding to each function.

In addition, as another example, the output control unit 111 may present the display information so that the reliability corresponding to each of the functions can be identified when the display information indicating each function is presented.

The example of the flow of the process in which the information processing device 1 presents the candidates for the function of executing the process in accordance with the instruction content indicated by the natural sentence input by the user has been described above with reference to FIG. 7.

[Process of Receiving Selection from User and Executing Function]

Next, an example of the flow of a process in which the information processing device 1 receives selection of an extraction result of each function from the user and executes a function selected by the user will be described with reference to FIG. 8.

(Step S201)

When the user selects information corresponding to a desired function via the input unit 23 (for example, a touch panel) from information (for example, display information) indicating functions presented by the information processing device 1, control information indicating content of a manipulation related to the selection is output to the input analysis unit 103 from the input unit 23. The input analysis unit 103 recognizes the manipulation content of the user on the basis of the control information acquired from the input unit 23 and recognizes the information selected by the user (that is, the information corresponding to the function desired by the user) among the information indicating the functions in accordance with the recognized manipulation content. Then, the input analysis unit 103 outputs the information indicating the function selected by the user to the function determination unit 109.

In addition, as another example, it is assumed that the user inputs information corresponding to a desired function by a sound among information corresponding to the functions presented by the information processing device 1. In this case, the sound recognition unit 101 converts a sound input by the user into text information on the basis of a sound recognition technology and outputs the text information to the natural language processing unit 105. The natural language processing unit 105 recognizes meaning content of the text information by acquiring the text information indicating instruction content from the user from the sound recognition unit 101 and analyzing the acquired text information based on the natural language processing technology. Then, the natural language processing unit 105 outputs a result of the natural language processing on the text information indicating the instruction content from the user, that is, information indicating the function selected by the user, to the function determination unit 109.

(Step S203)

The function determination unit 109 acquires the information indicating the function selected by the user from the input analysis unit 103 or the natural language processing unit 105.

Subsequently, the function determination unit 109 extracts a parameter (in other words, a key phrase) used to execute the function selected by the user on the basis of the previously acquired result of the natural language processing on the text information indicating the instruction content of the user. For example, when the selected function is the function of "map" or "transfer guide," the function determination unit 109 extracts a key phrase indicating a destination as a parameter for executing the function on the basis of the acquired result of the natural language processing.

Then, the function determination unit 109 outputs the information indicating the function selected by the user and information indicating the parameter (key phrase) for executing the function to the process execution unit 113.

The process execution unit 113 reads data (for example, a library) for executing a function (for example, an application) designated by the function determination unit 109 from a predetermined storage region.

(Step S205)

Also, at this time, when the designated function is not installed in the information processing device 1 (NO in step S203), the process execution unit 113 may install the function in the information processing device 1. In addition, at this time, for example, the process execution unit 113 may access a server via a network and acquire (download) data necessary to install the function from the server. In addition, at this time, the process execution unit 113 determines whether to install a corresponding function by causing the output control unit 111 to output information for confirming whether to install the function and receiving an instruction from the user.

Also, when the designated function is already installed in the information processing device 1 (YES in step S203), it is needless to say that a process related to the installation of the foregoing function may not be executed.

(Step S207)

Then, the process execution unit 113 executes the function designated based on the data read using the acquired parameter as an input and outputs an execution result of the function to the output control unit 111.

The output control unit 111 acquires an execution result of the function selected by the user from the process execution unit 113 and presents information indicating the execution result to the user via the output unit 40.

The example of the flow of the process in which the information processing device 1 receives the selection of the extraction result of each function from the user and executes the function selected by the user has been described above with reference to FIG. 8.

<4. Hardware Configuration>

Figure 9:
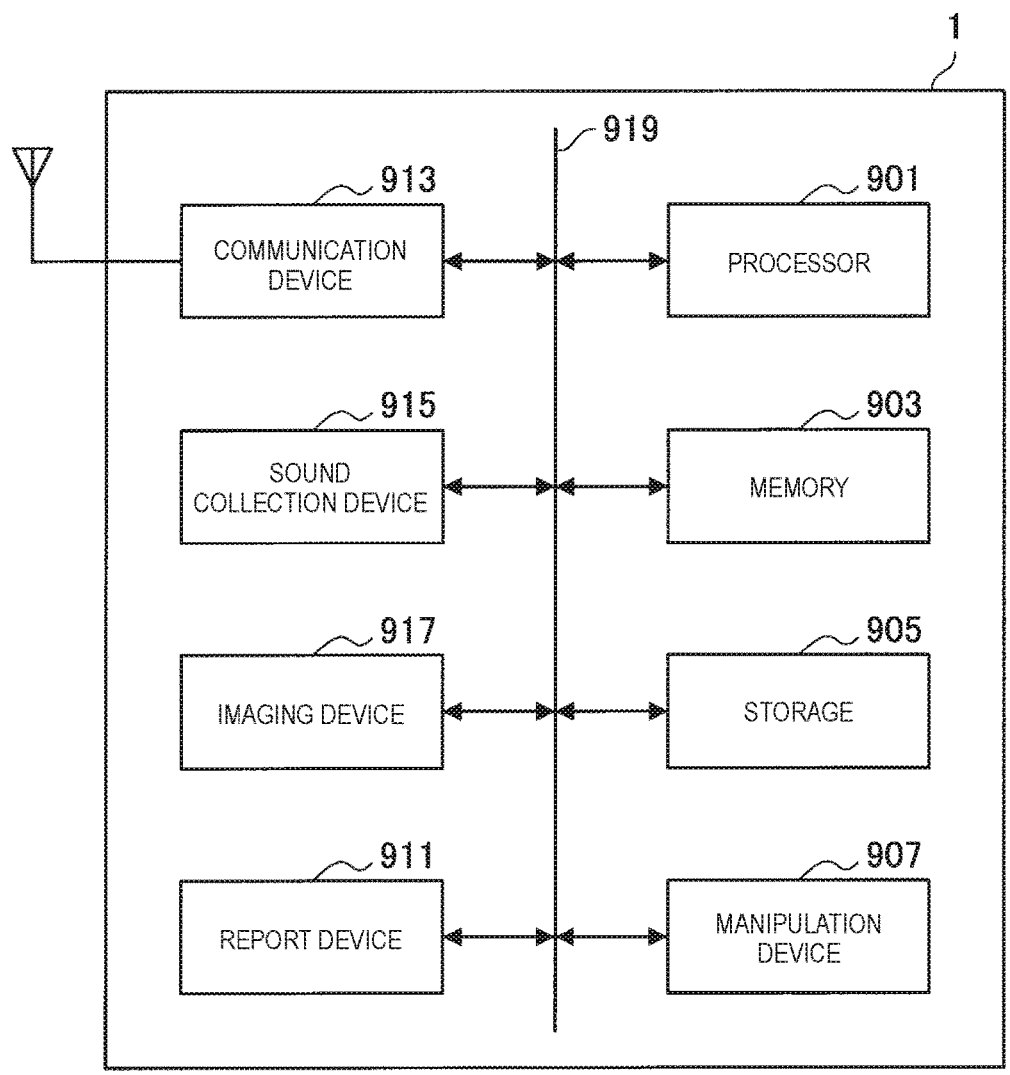
FIG. 9 is a diagram illustrating an example of a hardware configuration of the information processing device according to the embodiment.

Next, an example of a hardware configuration of the information processing device 1 according to each embodiment of the present disclosure will be described with reference to FIG. 9. FIG. 9 is a diagram illustrating an example of the hardware configuration of the information processing device 1 according to the embodiment.

As illustrated in FIG. 9, the information processing device 1 according to the embodiment includes a processor 901, a memory 903, a storage 905, a manipulation device 907, a report device 911, a sound collection device 915, an imaging device 917, and a bus 919. In addition, the information processing device 1 may also include a communication device 913.

The processor 901 may be, for example, a central processing unit (CPU), a graphics processing unit (GPU), a digital signal processor (DSP), or a system on chip (SoC) and executes various processes of the information processing device 1. The processor 901 can be configured by, for example, an electronic circuit that executes various calculation processes. Also, each configuration of the above-described control unit 10 can be realized by the processor 901.

The memory 903 includes a random access memory (RAM) and a read-only memory (ROM) and stores data and a program to be executed by the processor 901. The storage 905 can include a storage medium such as a semiconductor memory or a hard disk. For example, the above-described storage unit 30 can be realized by at least one of the memory 903 and the storage 905 or a combination of both the memory 903 and the storage 905.

The manipulation device 907 has a function of generating an input signal used for the user to execute a desired manipulation. The manipulation device 907 can be configured as, for example, a touch panel. In addition, as another example, the manipulation device 907 may be configured to include an input unit such as a button, a switch, and a keyboard that allows the user to input information and an input control circuit that generates an input signal on the basis of an input by the user and supplies the input signal to the processor 901. Also, the above-described input unit 23 can be realized by the manipulation device 907.

The report device 911 is an example of an output device and may be, for example, a device such as a liquid crystal display (LCD) device, or an organic EL (organic light emitting diode (OLED)) display. In this case, the report device 911 can report predetermined information to the user by displaying a screen. In addition, the report device 911 may be a device such as a speaker that reports predetermined information to the user by outputting a predetermined acoustic signal. Also, the above-described output unit 40 can be realized by the report device 911.

The foregoing example of the report device 911 is merely an example. The aspect of the report device 911 is not particularly limited as long as predetermined information can be reported to the user. As a specific example, the report device 911 may be a device such as a light emitting diode (LED) that reports predetermined information to the user by a flickering pattern. In addition, the report device 911 may be a device such as a vibrator that vibrates to report predetermined information to the user.

The communication device 913 is communication means included in the information processing device 1 and communicates with an external device via a network. The communication device 913 is a wired or wireless communication interface. When the communication device 913 is configured as a wireless communication interface, the communication device 913 may include a communication antenna, a radio frequency (RF) circuit, and a baseband processor.

The communication device 913 has a function of executing various signal processes on a signal received from an external device and can supply a digital signal generated from a received analog signal to the processor 901.

The sound collection device 915 is a device such as a microphone that collects a sound arriving from the user and a surrounding environment acoustic sound and acquires acoustic information (an acoustic signal). In addition, the sound collection device 915 may acquire data indicating an analog acoustic signal indicating the collected sound or acoustic sound or may convert the analog acoustic signal into a digital acoustic signal to acquire data indicating the converted digital acoustic signal as acoustic information. Also, the above-described sound collection unit 21 can be realized by the sound collection device 915.

The imaging device 917 includes an image sensor such as a complementary metal-oxide semiconductor (CMOS) image sensor or a charge coupled device (CCD) image sensor that images a subject to obtain digital data of the captured image. That is, the imaging device 917 has a function of capturing a still image or a moving image via an optical system such as a lens under the control of the processor 901. The imaging device 917 may store the captured image in the memory 903 or the storage 905.

The bus 919 connects the processor 901, the memory 903, the storage 905, the manipulation device 907, the display device 909, the communication device 913, the sound collection device 915, and the imaging device 917 to each other. The bus 919 may include a plurality of kinds of buses.

In addition, it is also possible to generate a program causing hardware such as a processor, a memory, and a storage contained in a computer to execute the same function as the configuration of the foregoing information processing device 1. In addition, it is possible to provide a computer-readable storage medium that records the program.

<5. Conclusion>

As described above, the information processing device 1 according to the embodiment calculates the reliability of each target function on the basis of the so-called supervised document classification problem using the result of the natural language processing on the text information indicating the instruction content from the user as the input. In addition, the information processing device 1 may control the reliability calculated for each function on the basis of the information indicating the state or the situation involved in use of the information processing device 1, such as the state of the information processing device 1, the situation in which the information processing device 1 is used, and the past execution histories of various functions.

The information processing device 1 extracts the functions which are the candidates for the response to the instruction content from the user in accordance with the reliability calculated for each function, presents the information indicating the function to the user, and the executes the function selected by the user. At this time, the information processing device 1 may control a presentation aspect (for example, a display aspect such as a presentation order or the size or color of the display information) of the information indicating the function in accordance with the reliability of each of the extracted functions.

In this configuration, the information processing device 1 can present a function closer to an intention of the user in response to a change in a situation or the user even in a situation in which a natural sentence with ambiguity is input as an instruction from the user. Thus, the user can cause the information processing device 1 to execute the function intended by the user without involving a complicated manipulation.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1) An information processing device including:
   circuitry configured to acquire an extraction result of candidates for a response to an input which is based on first information indicating a result of natural language analysis on a natural sentence acquired as the input and second information indicating a state or a situation involved in use of a predetermined device; and
   a control unit configured to cause a predetermined output unit to present information indicating the candidates for the response in an aspect corresponding to the extraction result of the candidates.

(2) The information processing device according to (1), in which the circuitry acquires the information indicating the candidates for the response and information indicating reliability showing that the candidates are the response to the input as the extraction result, and the control unit causes the predetermined output unit to present the information indicating the candidates for the response in an aspect corresponding to the reliability corresponding to the candidates.

(3) The information processing device according to (2), including:

an extraction unit configured to output the information indicating the candidates for the response and the information indicating the reliability corresponding to the candidates as the extraction result on the basis of the first information and the second information. (4) The information processing device according to (3), in which the extraction unit controls the reliability corresponding to each of the candidates for the response to the input extracted on the basis of the first information on the basis of the second information, and outputs at least some of the candidates for the response and the reliability corresponding to at least some of the candidates as the extraction result in accordance with the controlled reliability.

(5) The information processing device according to any one of (1) to (4), in which the circuitry acquires extracted candidates for an function as the extraction result of the candidates for the response to the input, and the control unit causes the output unit to present the extracted candidates for the function.

(6) The information processing device according to (5), in which the control unit receives selection of some of the presented candidates for the function and executes functions corresponding to the selected candidates.

(7) The information processing device according to (6), in which the control unit causes the output unit to present display information indicating each of the extracted candidates for the function, and receives a manipulation on the display information and recognizes that a function corresponding to the display information to be subjected to the manipulation is selected.

(8) The information processing device according to (6)

in which the control unit receives a sound input indicating some of the presented candidates for the function and recognizes that some of the candidates are selected. (9) The information processing device according to any one of (1) to (8), in which the control unit causes the output unit to present information indicating the candidates for the response in a display aspect corresponding to the extraction result of the candidates.

(10) The information processing device according to any one of (1) to (8), in which the control unit causes the output unit to present information indicating each of the candidates for a plurality of the responses in an order corresponding the extraction result of each of the candidates for the corresponding responses.

(11) The information processing device according to any one of (1) to (10), in which the second information includes information indicating a state of the device.

(12) The information processing device according to any one of (1), to (11)

in which the second information includes information which is based on a past use situation of the device by the user.

(13) The information processing device according to (12), in which the information which is based on the past use situation of the device by the user includes a history of information which is based on a natural sentence input by the user.

(14) The information processing device according to (12) or (13), in which the information which is based on the past use situation of the device by the user includes a history of a function executed on the basis of an instruction from the user.

(15) The information processing device according to any one of (1) to (14), including:

a natural language processing unit configured to execute the natural language analysis on a natural sentence acquired as the input and output the result of the natural language analysis as the first information.

(16) An information processing method including:

acquiring an extraction result of candidates for a response to an input which is based on first information indicating a result of natural language analysis on a natural sentence acquired as the input and second information indicating a state or a situation involved in use of a predetermined device; and causing, by a processor, a predetermined output unit to present information indicating the candidates for the response in an aspect corresponding to the extraction result of the candidates.

(17) A program causing a computer to execute:

acquiring an extraction result of candidates for a response to an input which is based on first information indicating a result of natural language analysis on a natural sentence acquired as the input and second information indicating a state or a situation involved in use of a predetermined device; and causing a predetermined output unit to present information indicating the candidates for the response in an aspect corresponding to the extraction result of the candidates.

REFERENCE SIGNS LIST

1 information processing device
10 control unit
101 sound recognition unit
103 input analysis unit
105 natural language processing unit
107 state detection unit
109 function determination unit
111 output control unit
113 process execution unit
21 sound collection unit
23 input unit
30 storage unit
40 output unit

The invention claimed is:

1. An information processing device, comprising:
   circuitry configured to:
      determine a reliability of each function of a plurality of functions based on data accumulated by use of a result of a natural language processing operation;
      extract at least one function of the plurality of functions as a candidate, based on the reliability of the at least one function that exceeds a threshold value;
      acquire an extraction result of each function of the plurality of functions, wherein
         each function of the plurality of functions is extracted as the candidate for a response to a user input, the user input comprises one of text information or sound information,
the candidate is extracted based on an instruction,
the instruction is indicated by a natural sentence,
the natural sentence is acquired from the user input,
the acquisition of the extraction result is based on first information and second information,
the first information indicates a result of natural language analysis on the natural sentence, and
the second information indicates a network state of the information processing device;
present third information,
wherein the third information indicates the candidate for the response in a presentation aspect corresponding to the extraction result of the candidate;
select the extracted candidate;
extract a key phrase based on the result of the natural language analysis on the natural sentence from the user input; and
execute the at least one function associated with the selected candidate, based on the extracted key phrase.

2. The information processing device according to claim 1,
wherein the circuitry is further configured to:
acquire the third information indicating the candidate for the response and fourth information indicating, as the extraction result, the reliability that the candidate is the response to the user input; and
present, on a display screen, the third information indicating the candidate for the response in the presentation aspect corresponding to the reliability.

3. The information processing device according to claim 2, wherein
the circuitry is further configured to output the third information indicating the candidate for the response and the fourth information indicating, as the extraction result, the reliability corresponding to the candidate, and
the output of the third information and the fourth information is based on the first information and the second information.

4. The information processing device according to claim 3,
wherein the circuitry is further configured to:
control the reliability corresponding to the candidate for the response to the user input, and
output, based on the controlled reliability, the candidate for the response and the reliability corresponding to the candidate as the extraction result.

5. The information processing device according to claim 1,
wherein the circuitry is further configured to:
acquire the extracted candidate for the at least one function as the extraction result of the candidate for the response to the user input; and
present, on a display screen, the extracted candidate.

6. The information processing device according to claim 5,
wherein the circuitry is further configured to:
present, on the display screen, display information indicating the candidate for the at least one function;
receive a manipulation on the display information; and
recognize a selection of the at least one function corresponding to the display information subjected to the manipulation.

7. The information processing device according to claim 5,
wherein the circuitry is further configured to:
receive a sound input indicating the presented candidate for the at least one function; and
recognize a selection of the candidate.

8. The information processing device according to claim 1, wherein the circuitry is further configured to present, on a display screen, the third information indicating the candidate for the response in a display aspect corresponding to the extraction result of the candidate.

9. The information processing device according to claim 1, wherein the circuitry is further configured to present fourth information indicating each candidate of a plurality of candidates for a plurality of responses in an order corresponding to the extraction result of each candidate of the plurality of candidates for a corresponding response of the plurality of responses.

10. The information processing device according to claim 1, wherein the second information includes fourth information which is based on a past use situation of the information processing device.

11. The information processing device according to claim 10, wherein
the fourth information includes history information associated with the past use situation of the information processing device, and
the past use situation of the information processing device is based on the natural sentence from the user input.

12. The information processing device according to claim 10, wherein
the fourth information includes a history of a function of the plurality of the functions, and
execution of the function of the plurality of functions is based on a user instruction.

13. The information processing device according to claim 1, wherein the circuitry is further configured to:
execute the natural language analysis on the natural sentence acquired from the user input; and
output the result of the natural language analysis as the first information.

14. The information processing device according to claim 1, wherein the network state corresponds to an indoor state.

15. An information processing method, comprising:
in an information processing device:
determining a reliability of each function of a plurality of functions based on data accumulated by use of a result of a natural language processing operation;
extracting at least one function of the plurality of functions as a candidate, based on the reliability of the at least one function that exceeds a threshold value;
acquiring an extraction result of each function of the plurality of functions, wherein
each function of the plurality of functions is extracted as the candidate for a response to a user input,
the user input comprises one of text information or sound information,
the candidate is extracted based on an instruction,
the instruction is indicated by a natural sentence,
the natural sentence is acquired from the user input,
the acquisition of the extraction result is based on first information and second information,
the first information indicates a result of natural language analysis on the natural sentence, and
the second information indicates a network state of the information processing device;
presenting third information, wherein the third information indicates the candidate for the response in a presentation aspect corresponding to the extraction result of the candidate;
selecting the extracted candidate;
extracting a key phrase based on the result of the natural language analysis on the natural sentence from the user input; and
executing the at least one function associated with the selected candidate, based on the extracted key phrase.

16. A non-transitory computer-readable medium having stored thereon computer-executable instructions that, when executed by a processor of an information processing device, cause the processor to execute operations, the operations comprising:
determining a reliability of each function of a plurality of functions based on data accumulated by use of a result of a natural language processing operation;
extracting at least one function of the plurality of functions as a candidate, based on the reliability of the at least one function that exceeds a threshold value;
acquiring an extraction result of each function of the plurality of functions, wherein
each function of the plurality of functions is extracted as the candidate for a response to a user input,
the user input comprises one of text information or sound information,
the candidate is extracted based on an instruction,
the instruction is indicated by a natural sentence,
the natural sentence is acquired from the user input,
the acquisition of the extraction result is based on first information and second information,
the first information indicates a result of natural language analysis on the natural sentence, and
the second information indicates a network state of the information processing device;
presenting third information,
wherein the third information indicates the candidate for the response in a presentation aspect corresponding to the extraction result of the candidate;
selecting the extracted candidate;
extracting a key phrase based on the result of the natural language analysis on the natural sentence from the user input; and
executing the at least one function associated with the selected candidate, based on the extracted key phrase.

* * * * *